United States Patent
Muller et al.

(10) Patent No.: US 8,694,214 B2
(45) Date of Patent: Apr. 8, 2014

(54) AUTOMATIC TRANSMISSION FOR A MOTOR VEHICLE

(75) Inventors: Thorsten Muller, Friedrichshafen (DE); Peter Schiele, Kressbronn (DE); Linus Eschenbeck, Wangen (DE); Oliver Gloge, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1227 days.

(21) Appl. No.: 12/345,907

(22) Filed: Dec. 30, 2008

(65) Prior Publication Data

US 2009/0177361 A1 Jul. 9, 2009

(30) Foreign Application Priority Data

Jan. 9, 2008 (DE) .......................... 10 2008 000 019

(51) Int. Cl.
*F16N 9/00* (2006.01)

(52) U.S. Cl.
USPC ............................................. 701/51; 184/6.2

(58) Field of Classification Search
USPC ............................................. 701/51; 184/6.2
See application file for complete search history.

(56) References Cited

U.S. PATENT DOCUMENTS

| 4,903,798 A | * | 2/1990 | Takemoto et al. ........... 184/6.24 |
| 5,908,286 A | * | 6/1999 | Clemmons ................... 417/44.2 |
| 6,253,137 B1 | | 6/2001 | Abo et al. |
| 6,386,170 B1 | | 5/2002 | Iwano et al. |
| 7,232,402 B2 | * | 6/2007 | Tryon et al. ....................... 477/5 |
| 2004/0029677 A1 | | 2/2004 | Mori et al. |

FOREIGN PATENT DOCUMENTS

| DE | 100 28 074 A1 | 5/2001 |
| DE | 10 2006 012 838 A1 | 11/2006 |
| DE | 102006012838 A1 | * 11/2006 |
| WO | WO-2006/123079 A2 | 11/2006 |

OTHER PUBLICATIONS

Machine Translation of DE 102006012838 A1.*

* cited by examiner

*Primary Examiner* — Adam Tissot
(74) *Attorney, Agent, or Firm* — Davis & Bujold, PLLC; Michael J. Bujold

(57) ABSTRACT

An automatic transmission of a motor vehicle driven by an internal combustion engine with a transmission oil circuit, a main oil pump, mechanically driven by a combustion engine, and an auxiliary oil pump (1) that can be electrically driven and is located inside an oil sump (4). It is proposed that the auxiliary oil pump (1) is arranged transversely with respect to the travel direction (x) of the motor vehicle.

18 Claims, 5 Drawing Sheets

AUTOMATIC TRANSMISSION FOR A MOTOR VEHICLE

This application claims priority from German Application Serial No. 10 2008 000 019.1 filed Jan. 9, 2008.

FIELD OF THE INVENTION

The invention concerns an automatic transmission of a motor vehicle driven by an internal combustion engine.

BACKGROUND OF THE INVENTION

The automatic transmission disclosed in DE 10 2006 012 838 A1 by the present Applicant comprises a main oil pump that can be driven by the combustion engine of the motor vehicle and an auxiliary, electric oil pump, i.e., one that can be driven by an electric motor, for the transmission oil circuit of the automatic transmission. The mechanically driven main oil pump can be designed as a converter throat pump and can be arranged co-axially with the transmission input shaft. However, a non-co-axial arrangement and a mechanical drive, via an auxiliary shaft, are also possible. The auxiliary oil pump, which is used, in particular with an automatic start-stop system of the motor vehicle, is arranged in an oil sump located under the transmission and is connected to the transmission housing via a flange. The driving electric motor may be located either inside or outside the oil sump.

The purpose of the present invention is to improve the fitting situation for an auxiliary oil pump still further and to utilize the available structural space in the transmission in an optimum manner.

SUMMARY OF THE INVENTION

It is provided that the auxiliary oil pump is positioned transversely with respect to the travel direction of the motor vehicle within the transmission housing and/or the oil sump. In this way, structural space is gained particularly in the travel direction (x-axis) of the motor vehicle.

The automatic transmission comprises a parking lock mechanism, i.e., a parking lock gear wheel, preferably arranged on the drive output shaft and a parking lock pawl which engages in the parking lock gear wheel. According to the invention, the auxiliary oil pump is arranged under the parking lock mechanism. In this way, the filling space in the transmission in this area is used to good advantage. The automatic transmission can be of any structure. For example, the automatic transmission can be designed as an automatic variable-speed transmission, an automated change-gear transmission, a dual-clutch transmission or even a continuously-variable transmission with or without power branching, without or even with an additional hybrid module or hybrid drive.

The auxiliary oil pump can advantageously be combined with an electric motor to form a structural unit, a pump aggregate, which as an advantageous design feature, is attached to the transmission housing or the oil sump.

In addition, the automatic transmission comprises a hydraulic shifting unit (HSU) under the transmission and a transmission oil filter, which is located in the oil sump. The auxiliary oil pump or the structural unit comprising it is arranged behind the hydraulic shifting unit relative to the direction of travel.

As an advantageous design feature, the pressure connection of the auxiliary oil pump is connected to the hydraulic shifting unit and the suction connection to the oil filter. This ensures that the paths of the suction and pressure connections are short, resulting in a small pressure drop.

Advantageously, the auxiliary electric oil pump or its structural unit is associated with a pump control unit, which is connected to the electric motor by connection leads. The pump control unit can either be outside the transmission housing or inside the oil sump and integrated with the electric motor.

The automatic transmission also has an electronic transmission control unit (EGS) arranged inside the transmission housing, which is connected to the pump control unit by a signal lead.

According to a further preferred embodiment, the spatial arrangement of the main oil pump and the auxiliary oil pump is such that the central axis of the auxiliary oil pump is below the central axis of the main oil pump. In this way, the suction height for the auxiliary oil pump is smaller, which increases its functional reliability.

BRIEF DESCRIPTION OF THE DRAWINGS

The invention will now be described, by way of example, with reference to the accompanying drawings in which.

DETAILED DESCRIPTION OF THE INVENTION

Figure 1:
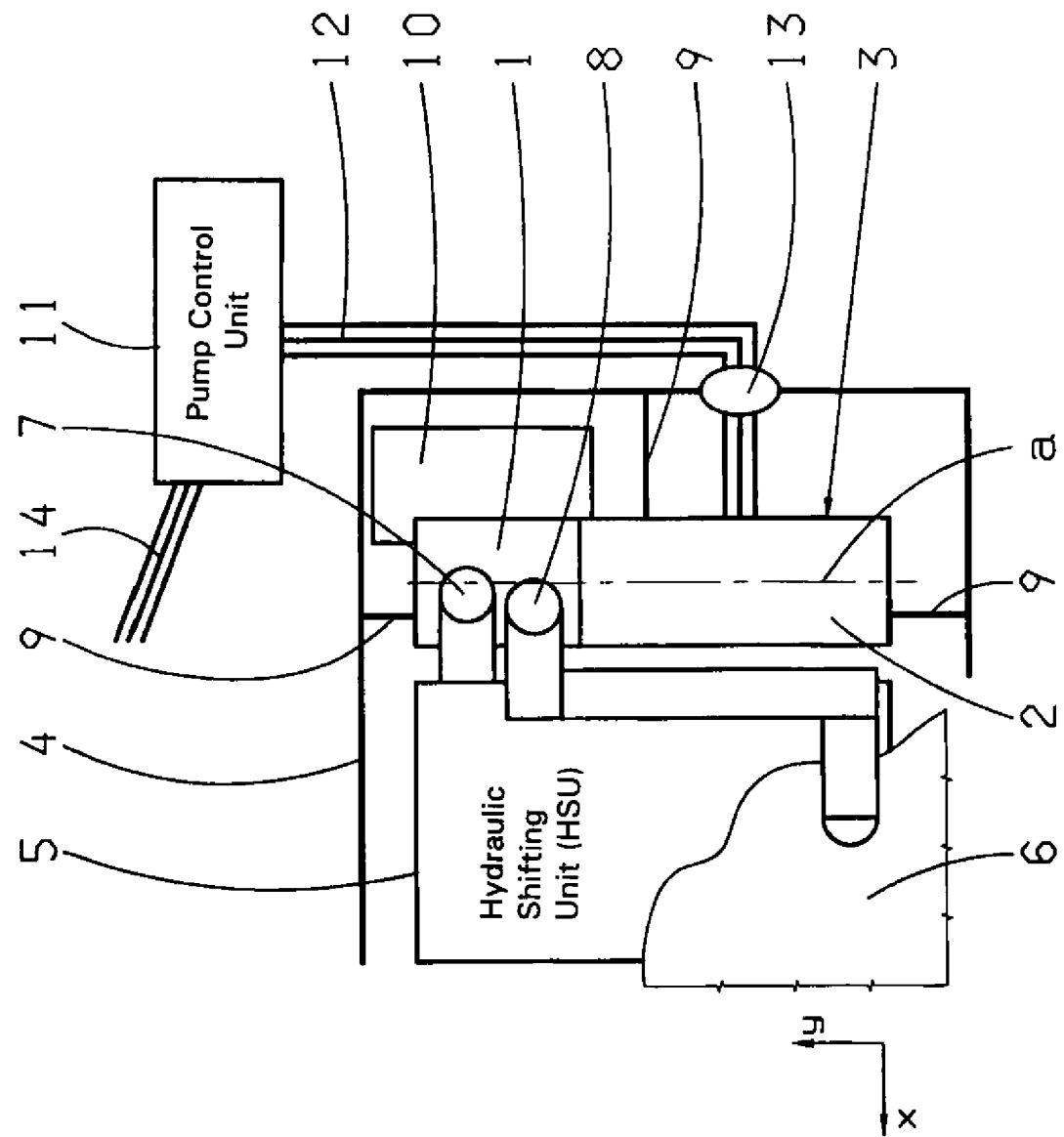
FIG. 1 is a first arrangement of an auxiliary electric oil pump in a transmission.

FIG. 1 shows a first embodiment of the invention, with a structural unit 3 comprising an arrangement of an auxiliary oil pump 1 and an electric motor 2 in a transmission housing 4 of an automatic transmission for a motor vehicle. The travel direction of the motor vehicle is indicated by a co-ordinate arrow x and the transverse direction to the travel direction by a co-ordinate arrow y. The structural unit 3, also called the pump aggregate, has a longitudinal axis a which extends in the y direction, i.e., transversely with respect to the travel direction of the motor vehicle. Inside the transmission housing, which also comprises an oil sump or is closed toward the outside by an oil sump, are arranged a hydraulic shifting unit (HSU) 5 and a transmission oil filter 6. The auxiliary oil pump 1 has a pressure connection 7 which is connected to the hydraulic shifting unit 5, and a suction connection 8 which is connected to the transmission oil filter 6, from which it draws in oil. The pump aggregate 3 is fixed relative to the transmission housing 4 or the oil sump by three schematically represented struts 9. Above the pump aggregate 3 (behind the plane of the drawing) a parking lock mechanism 10 is indicated schematically. The electric motor 2 of the pump aggregate 3 is controlled and supplied with current by a pump control unit 11 arranged outside the transmission housing 4, via connection leads 12. The connection leads 12, between the pump control unit 11 and the electric motor 2, pass into and through the transmission housing 4, via an aperture 13. For its part, the pump control unit 11 is supplied with current and signals from the vehicle via supply leads 14.

Figure 2:
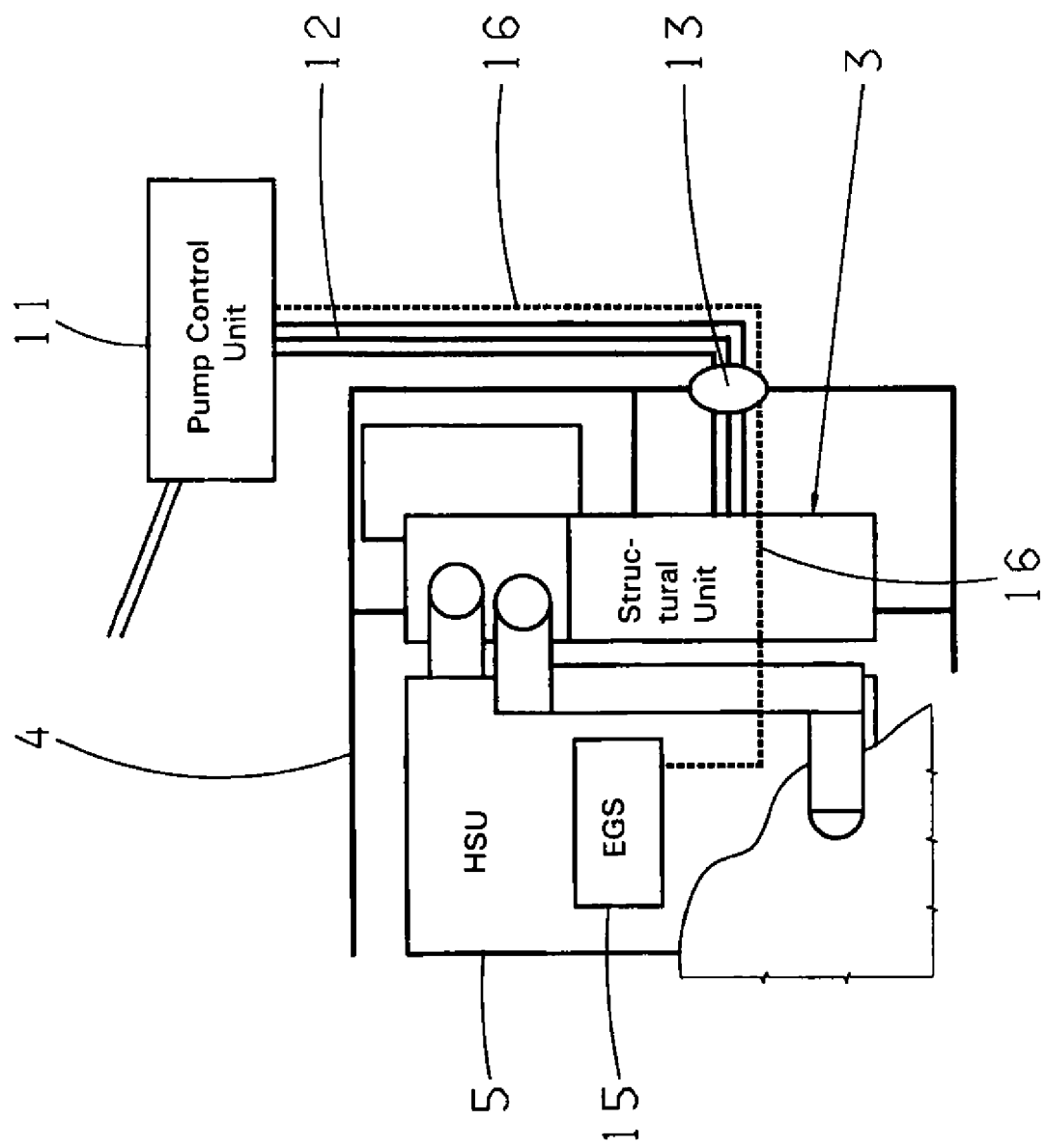
FIG. 2 is a second arrangement of an auxiliary electric oil pump in a transmission.

FIG. 2 shows another embodiment of the invention with the pump aggregate 3 arranged inside the transmission housing 4—the same index numbers as before being used for the same components. In contrast to the previous embodiment, an electronic transmission control unit (EGS) 15 is arranged inside the transmission housing 4, which is connected to the pump control unit 11 by an electric signal lead 16 (represented as a broken line) which passes through the aperture 13. Thus, in this case, the EGS 15 also serves as a signal emitter for the pump aggregate 3.

Figure 3:
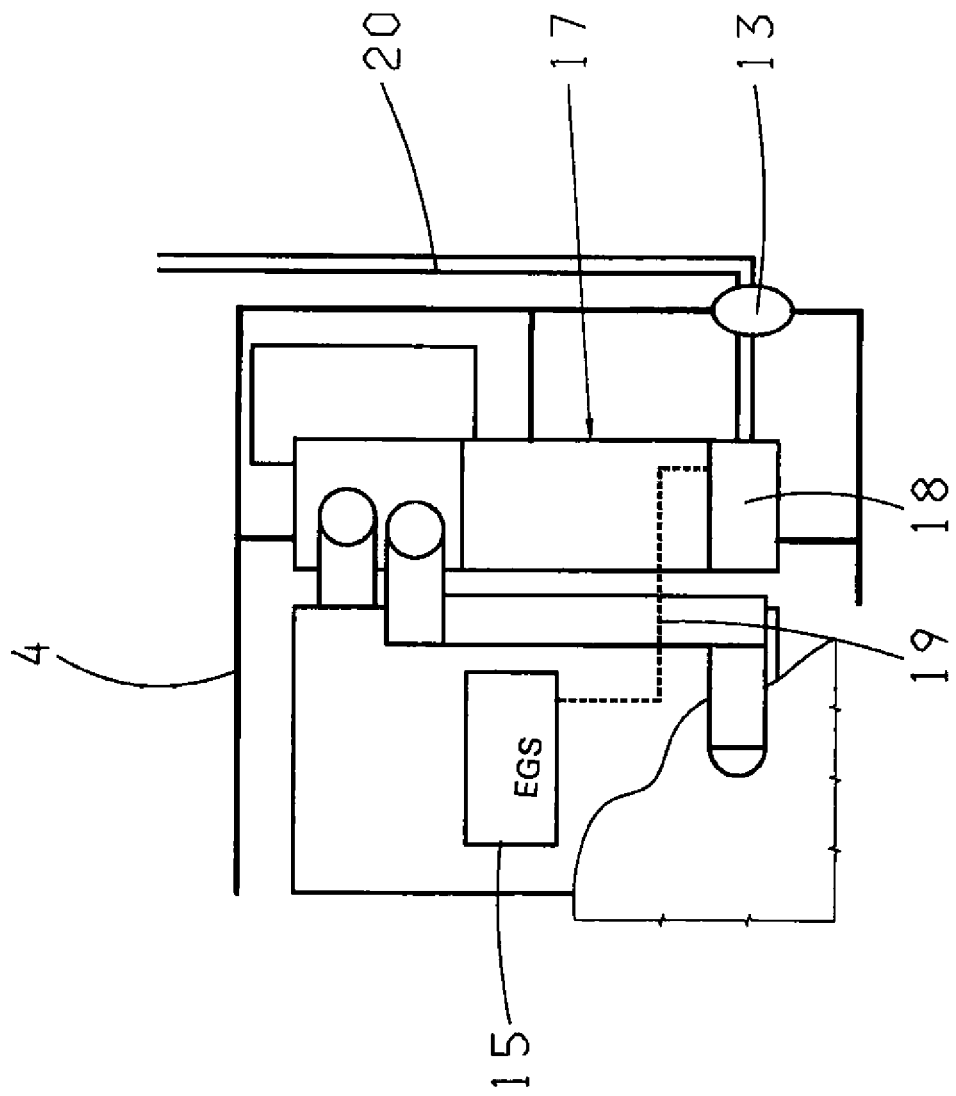
FIG. 3 is a third arrangement of an auxiliary electric oil pump in a transmission.

FIG. 3 shows a third embodiment of the invention for the arrangement of a pump aggregate 17 in which a pump control unit 18 is integrated. The latter is therefore inside the transmission housing 4 or oil sump. The electronic transmission control unit 15 is connected to the pump control unit 18 by an electric signal lead 19 (represented as a broken line) running inside the transmission housing 4. Current is supplied to the pump control unit 18 from the vehicle, via leads 20, which pass through the aperture 13 through the wall of the housing 4.

Instead of the signal lead 19 that connects the EGS 15 to the pump control unit 18, as shown in FIG. 3. In another embodiment of the invention it can also be provided that the pump aggregate 17 is controlled, via a separate signal lead from outside the transmission. Such a separate signal lead can be a data lead (CAN) which is connected electrically to the pump control unit 18, via a transmission plug, through whose electric contacts the electric voltage supply is also provided.

Figure 4:
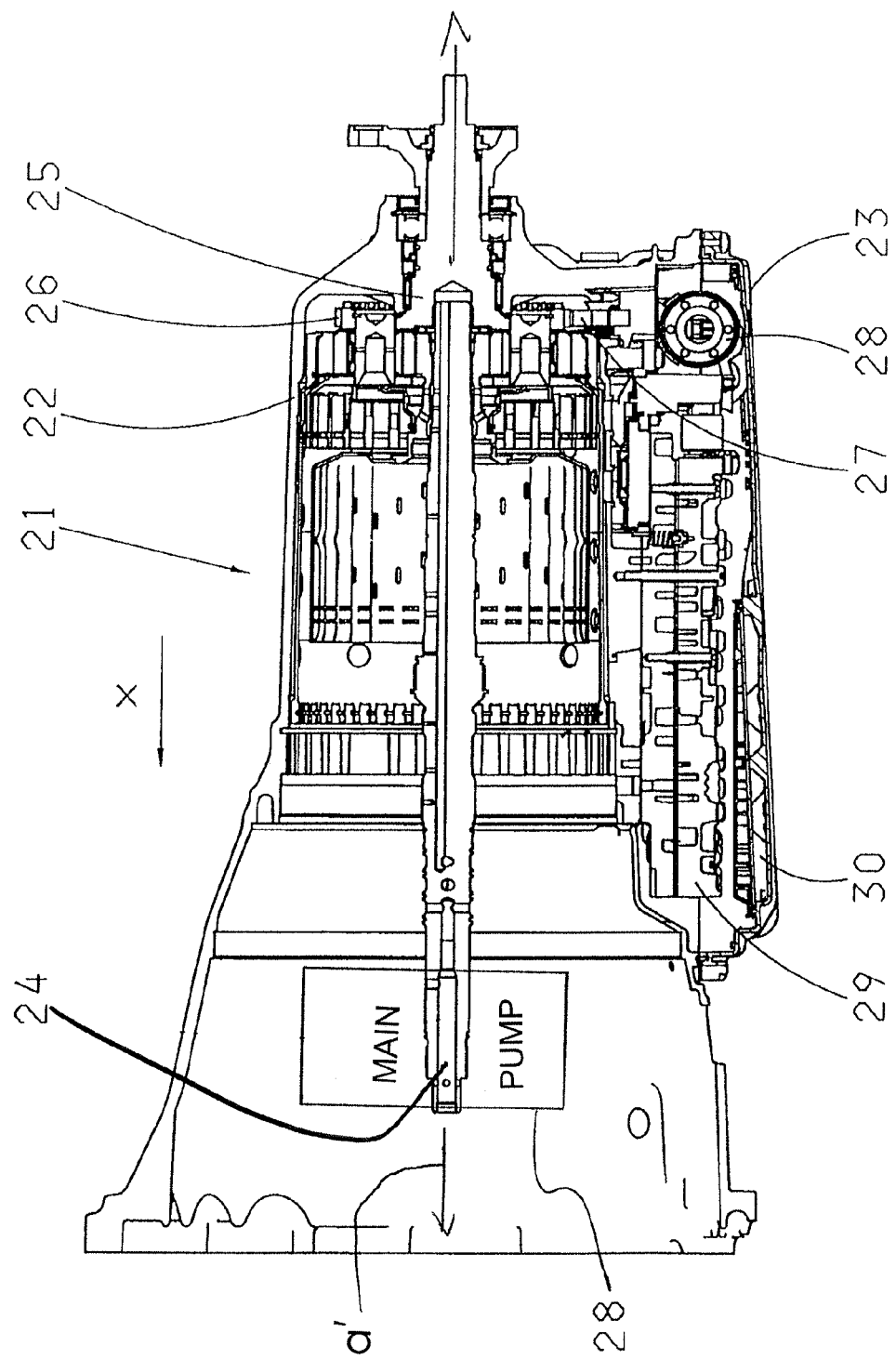
FIG. 4 is a longitudinal section through an automatic transmission with an auxiliary electric oil pump.

FIG. 4 shows a longitudinal section through an automatic transmission 21, which comprises a transmission housing 22 to the lower part of which an oil sump 23 is connected, via a flange. The transmission 21 has an input shaft 24 and an output shaft 25; the latter formed as the carrier shaft of a planetary gearset and having a parking lock gear wheel 26 on its circumference. Under the drive output shaft 25, a parking lock pawl 27 is arranged which, when the automatic transmission 21 is secured (selector lever in position P), engages in the parking lock gear wheel 26 and locks the transmission. The parking lock gear wheel 26 (parking lock teeth) and the parking lock pawl 27, in essence, form a parking lock mechanism. Under the parking lock mechanism 26, 27 a pump aggregate 28 is arranged within the transmission housing 22 or within the oil sump 23. The pump aggregate 28, comprising a pump, an electric motor and, in some cases, also a pump control unit, is positioned transversely to the travel direction; the latter being indicated by a coordinate arrow x. Ahead of the pump aggregate 28 in the travel direction, there is a hydraulic shifting unit (HSU) 29 under the input shaft 24 and an oil filter 30 in the lowest area of the oil sump 23. The main oil pump 28 is driven by a combustion engine of the motor vehicle and the main oil pump 28 has a central axis a'. The central axis a of the auxiliary oil pump 1 or the pump aggregate 3, 28 is positioned vertically below the central axis a' of the main oil pump.

Figure 5:
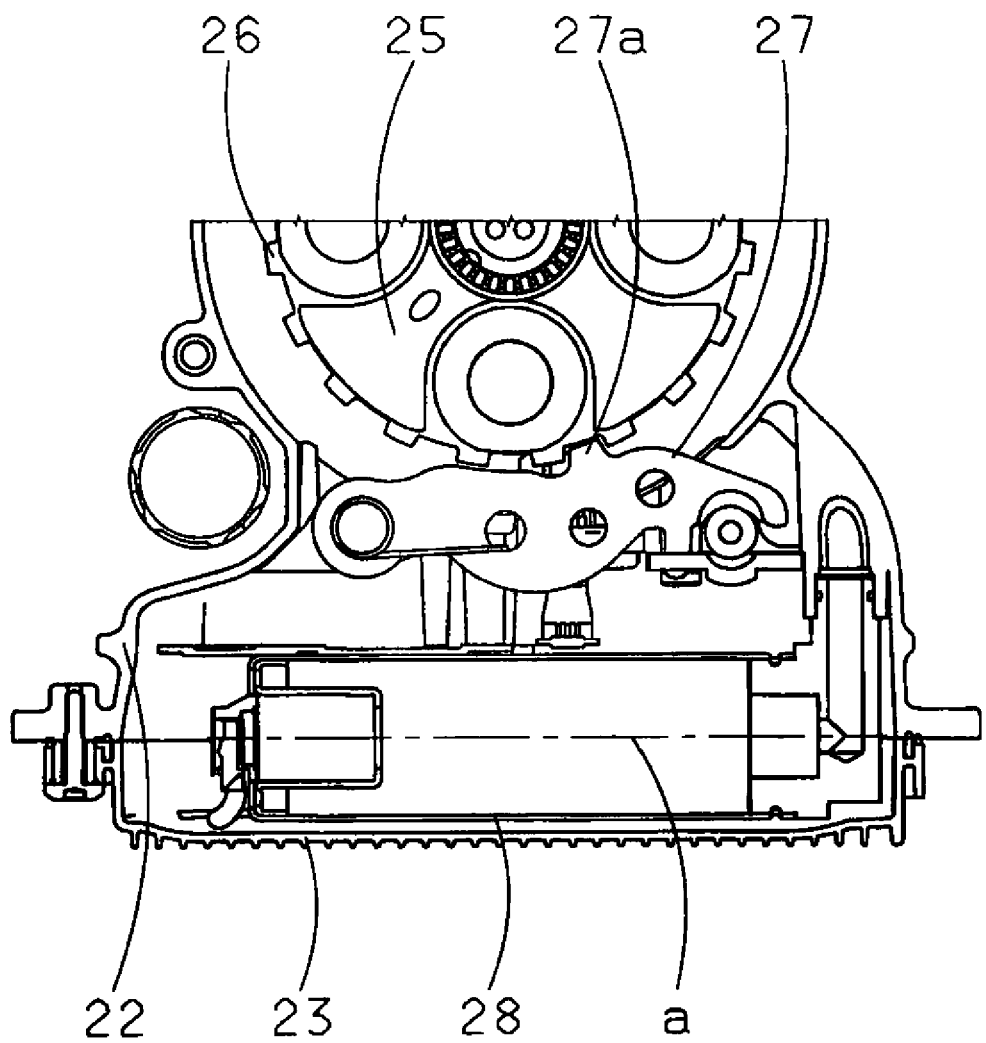
FIG. 5 is a cross-section through the automatic transmission, with the parking lock and the auxiliary electric oil pump.

FIG. 5 shows a partial view of the automatic transmission 21 in the axial direction, looking at the carrier shaft 25 made as a parking disk with its parking lock gear wheel 26. The parking lock pawl 27 is arranged under the parking disk 25, which engages with a pawl tooth 27a in a tooth gap of the parking lock gear wheel 26 and so locks the drive output shaft 25. The pump aggregate 28 is arranged under the parking lock pawl 27, whose longitudinal (central) axis a runs transversely with respect to the travel direction of the motor vehicle. The pump aggregate 28 extends nearly over the full width of the transmission housing 22 and the oil sump 23. Thus, the available space is used to good effect.

INDEXES 1 auxiliary oil pump
2 electric motor
3 structural unit (pump aggregate)
4 transmission housing
5 hydraulic shifting unit (HSU)
6 transmission oil filter
7 pressure connection
8 suction connection
9 fixing strut
10 parking lock mechanism
11 pump control unit
12 connection leads
13 aperture
14 supply leads
15 electronic transmission control unit (EGS)
16 signal lead
17 pump aggregate
18 pump control unit
19 signal control
20 current supply leads
21 automatic transmission
22 transmission housing
23 oil sump
24 input shaft
25 drive output shaft/carrier shaft/parking disk
26 parking lock gear wheel
27 parking lock pawl
27a pawl tooth
28 pump aggregate
29 hydraulic shifting unit (HSU)
30 oil filter
a longitudinal (central) axis
P selector lever in position
x travel direction coordinate arrow
y travel direction coordinate arrow

The invention claimed is:

1. An automatic transmission of a motor vehicle driven by an internal combustion engine, with a transmission oil circuit, the automatic transmission comprising:
a main oil pump that is driven mechanically by the combustion engine;
an auxiliary oil pump (1), arranged inside an oil sump (4, 23), which is driven electrically, the auxiliary oil pump (1, 28) being arranged transversely with respect to a travel direction (x) of the motor vehicle;
a parking lock mechanism (10; 25, 26, 27); and
the auxiliary oil pump (1, 28) being arranged vertically underneath and along a common vertical plane with the parking lock mechanism (26, 27).

2. The automatic transmission according to claim 1, wherein the auxiliary oil pump (1) is combined with an electric motor (2) to form a structural unit (3).

3. The automatic transmission according to claim 2, further comprising a transmission housing (4, 22), the oil sump (23) is attached to an underside of the transmission housing (4, 22) by a flange, and at least one of the auxiliary oil pump (1) or the structural unit (3) is attached to at least one of the transmission housing (4, 22) or the oil sump (23).

4. The automatic transmission according to claim 1, further comprising a hydraulic shifting unit (5, 29), and one of the auxiliary oil pump (1) or a pump aggregate (3, 28) is arranged behind the hydraulic shifting unit (5, 29) in the travel direction (x) of the motor vehicle.

5. The automatic transmission according to claim 4, wherein the auxiliary oil pump (1, 28) has a pressure connection (7) which is connected to the hydraulic shifting unit (5, 29).

6. The automatic transmission according to claim 4, wherein a transmission oil filter (6, 30) is arranged under the hydraulic shifting unit (5, 29) and the auxiliary oil pump (1, 28) has a suction connection (8) which is connected to the transmission oil filter (6, 30).

7. The automatic transmission according to claim 3, wherein the electric motor (2) is connected to a pump control unit (11, 18).

8. The automatic transmission according to claim 7, wherein the pump control unit (11) is arranged outside a transmission housing (4) and connection leads (12) extend from the pump control unit (11) to the electric motor (2) through the transmission housing (4, 13).

9. The automatic transmission according to claim 7, wherein the pump control unit (18) is arranged inside at least one of the transmission housing (4, 22) or the oil sump (23).

10. The automatic transmission according to claim 9, wherein the pump control unit (18) is integrated with the electric motor (17).

11. The automatic transmission according to claim 4, wherein the main oil pump and one of the auxiliary oil pump (1) or the pump aggregate (3, 28) have respective central axes, and the central axis of the auxiliary oil pump (1) or the pump aggregate (3, 28) is positioned vertically below the central axis of the main oil pump.

12. The automatic transmission according to claim 7, further comprising an electronic transmission control unit (15) with at least one signal lead (16, 19), which is connected to the pump control unit (11, 18).

13. An automatic transmission of a motor vehicle which is driven in a direction of travel (x) by an internal combustion engine, the automatic transmission comprising:
- an electric motor (2) that is co-axially coupled to and drives an auxiliary oil pump (1), the electric motor (2) and the auxiliary oil pump (1) being arranged inside an oil sump (4, 23) and being aligned transverse to the travel direction (x) of the motor vehicle;
- a parking lock mechanism (10; 25, 26, 27); and
- the auxiliary oil pump (1, 28) being arranged vertically underneath and along a common vertical plane with the parking lock mechanism (26, 27).

14. The automatic transmission according to claim 2, wherein at least one strut (9) secures the structural unit (3) relative to at least one of the transmission housing (4) and the oil sump.

15. The automatic transmission according to claim 2, wherein three struts (9) secure the structural unit (3) relative to at least one of the transmission housing (4) and the oil sump (23), two of the struts extend generally transversely to the travel direction (x) of the motor vehicle for minimizing lateral motion of the pump aggregate (3) and one of the struts extends generally parallel to the travel direction (x) of the motor vehicle for minimizing axial motion of the pump aggregate (3).

16. The automatic transmission according to claim 13, wherein the electric motor (2) and the auxiliary oil pump (1) form a structural unit (3) and at least one strut (9) secures the structural unit (3) relative to at least one of the transmission housing (4) and the oil sump.

17. The automatic transmission according to claim 13, wherein the electric motor (2) and the auxiliary oil pump (1) form a structural unit (3), three struts (9) secure the structural unit (3) relative to at least one of the transmission housing (4) and the oil sump (23), two of the struts extend generally transversely to the travel direction (x) of the motor vehicle for minimizing lateral motion of the pump aggregate (3) and one of the struts extends generally parallel to the travel direction (x) of the motor vehicle for minimizing axial motion of the pump aggregate (3).

18. An automatic transmission of a motor vehicle which is driven in a direction of travel (x) by an internal combustion engine, the automatic transmission comprising:
- an electric motor (2) that is co-axially coupled to and drives an auxiliary oil pump (1), the electric motor (2) and the auxiliary oil pump (1) forming a structural unit (3) which is arranged inside an oil sump (4, 23) and extends transversely to a travel direction (x) of the motor vehicle;
- a parking lock mechanism (10; 25, 26, 27) being located within the automatic transmission;
- the structural unit (3) being located adjacent and vertically beneath the parking lock mechanism (26, 27) and along a common vertical plane the parking lock mechanism (26, 27);
- a hydraulic shifting unit (HSU 29) being located along the travel direction (x) of the motor vehicle axially ahead of the structural unit (3);
- an oil filter (30) being located in a lowest area of the oil sump (23); and
- at least one strut (9) securing the structural unit (3) relative to at least one of the transmission housing (4) and the oil sump for minimizing motion of the pump aggregate (3).

\* \* \* \* \*